US006756879B2

(12) United States Patent
Shuster

(10) Patent No.: US 6,756,879 B2
(45) Date of Patent: Jun. 29, 2004

(54) METHOD AND APPARATUS FOR SECURING DELIVERY OF GOODS

(75) Inventor: Gary Stephen Shuster, Fresno, CA (US)

(73) Assignee: Ideaflood, Inc., Zephyr Cove, NV (US)

( * ) Notice: Subject to any disclaimer, the term of this patent is extended or adjusted under 35 U.S.C. 154(b) by 327 days.

(21) Appl. No.: 09/904,041

(22) Filed: Jul. 11, 2001

(65) Prior Publication Data

US 2002/0087429 A1 Jul. 4, 2002

Related U.S. Application Data

(60) Provisional application No. 60/217,614, filed on Jul. 11, 2000.

(51) Int. Cl.[7] .......................... B60R 25/00; G05B 19/00; G06F 7/00; G08B 29/00
(52) U.S. Cl. ....................................... 340/5.73; 700/214
(58) Field of Search .......................... 340/5.73; 700/214, 700/213, 228

(56) References Cited

U.S. PATENT DOCUMENTS

| 4,095,239 | A | | 6/1978 | Gerry |
| 4,654,745 | A | | 3/1987 | Corby |
| 4,686,529 | A | | 8/1987 | Kleefeldt |
| 4,709,564 | A | | 12/1987 | Minami |
| 5,223,829 | A | * | 6/1993 | Watabe ...................... 340/5.73 |
| 5,646,605 | A | | 7/1997 | Leonaggeo et al. |
| 5,774,053 | A | * | 6/1998 | Porter ...................... 340/568.1 |
| 5,894,277 | A | * | 4/1999 | Keskin et al. ............. 340/5.21 |
| 6,323,782 | B1 | * | 11/2001 | Stephens et al. .......... 340/10.31 |
| 6,344,796 | B1 | * | 2/2002 | Ogilvie et al. ........... 340/568.1 |
| 6,359,547 | B1 | * | 3/2002 | Denison et al. ............ 340/5.73 |
| 6,404,337 | B1 | * | 6/2002 | Van Till et al. ............. 340/569 |

* cited by examiner

Primary Examiner—Michael Horabik
Assistant Examiner—Scott Au
(74) Attorney, Agent, or Firm—O'Melveny & Myers LLP

(57) ABSTRACT

A method and apparatus for providing security for delivered goods purchased via electronic or telephonic commerce is provided in the form of a digital lock box, and method of operating the lock box in cooperation with senders of goods. This method further comprises generating a owner access code for full access to a secured area, individually dividing this secured area into a plurality of sections after each delivery, generating a delivery access code for access to particular sections of a secured area, forwarding this delivery access code to senders of deliverable goods, and deactivating this delivery access code after the delivery of these goods.

18 Claims, 6 Drawing Sheets

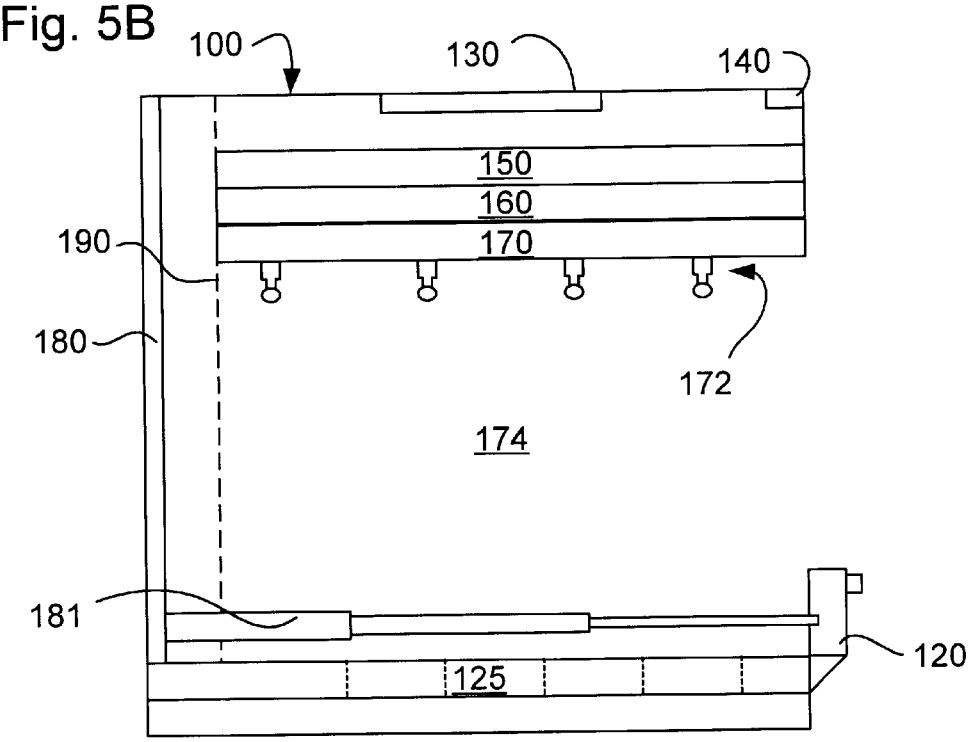
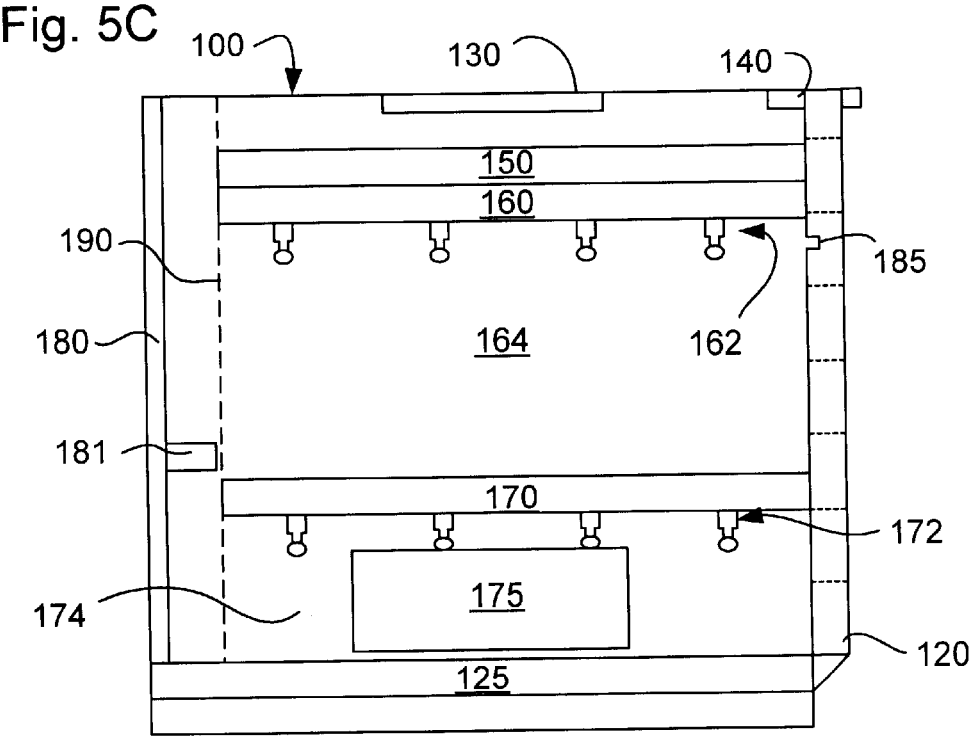

METHOD AND APPARATUS FOR SECURING DELIVERY OF GOODS

CROSS-REFERENCE TO RELATED APPLICATION

This application claims priority pursuant to 35 U.S.C. § 119(e) to U.S. Provisional Application No. 60/217,614, filed Jul. 11, 2000, which application is specifically incorporated herein, in its entirety, by reference.

BACKGROUND OF THE INVENTION

1. Field of the Invention

The present invention relates to a method and apparatus for securing delivery of goods from multiple senders to an address, such as frequently occurs when goods are purchased via electronic or telephonic commerce. More specifically, this invention pertains to a security box that provides either full or partial access to the contents within the security box according to variable combinations entered into a digital interface, and to a method of operating the security box in cooperation with senders and deliverers of goods.

2. Description of Related Art

For many years, the global retail market has been characterized as a market in which products are sold from physical locations. In recent years, however, this dynamic has undergone a significant change in response to the increasing popularity of the Internet and in particular with the increasing popularity of electronic commerce. Despite the many conveniences provided by the emerging electronic marketplace, however, some problems still exist. In particular, potential problems may stem from the fact that physical products purchased via electronic commerce are sometimes delivered to a vacant business or residence. For example, if a consumer is not home at the time of delivery, the delivery may be delayed, cancelled, or the delivery may be left unsecured outside the vacant business or residence.

Prior art methods developed to address this problem have primarily involved the use of a lock box secured outside of a business or residence. In one such prior art method, a lock box owner may mail a key to a mail-order merchant, along with payment for its product, so that the product may be securely delivered into the lock box by the deliverer. There are several problems, however, to this method including the fact that people are generally reluctant to send items such as keys through conventional mail for fear that they may be stolen or duplicated. A further problem exists in that is simply inconvenient for most people to physically send a key to a merchant via conventional mail.

Prior art methods developed to address this problem have mostly included methods of remotely setting lock codes and making them difficult to intercept. In particular, these prior arts anticipate the need for users to repeatedly and easily obtain access to a locked area. A problem still, however, exists in that no such method anticipates the need to grant a one-time only access to a locked area (e.g., a lock box), and thereafter prevent others (or even the same person) from later accessing the same area. With respect to delivering packages, a further problem exists in that no such method prevents package deliverers from obtaining access to the contents of prior deliveries. Another prior art method comprises providing a box into which mail or other items may be placed through a drop-off door. The door is configured so that items may not easily be removed through the drop-off door. Mail or other items dropped in the box may be removed from the box through a normally locked, larger access door. This method is commonly used by postal services for drop boxes, and is also the underlying method used with mail slots that enter into locked homes and other enclosures. However, the drop box or mail slot method is difficult to implement with large packages, because the drop-off door or mail slot cannot easily be made large enough for most packages without requiring a bulky enclosure.

A need in the industry therefore exists for a method to secure the delivery of purchased goods, and particularly, packages, to vacant businesses or residences. More specifically, a need in the industry exists for a method that provides package deliverers temporary access to a section of a secure area, preferably one containing no packages from prior deliveries.

SUMMARY OF THE INVENTION

In an embodiment of the invention, a method and apparatus for providing security for delivered goods is provided in the form of a digital lock box. The method further comprises generating a owner access code for full access to a secured area, generating a delivery access code for access to a section of the secured area designated for delivery of goods, forwarding this delivery access code to merchants of deliverable goods, and deactivating this delivery access code after the delivery of these goods. As used herein, "merchant" includes any person or entity from whom delivery of goods is desired, and is not limited to sellers of goods. Preferably, the method further comprises securing the delivered goods from access by later deliverers to the secured area. This may be accomplished by reconfiguring the secured area, such as by moving or closing a security gate, so that the section designated for future deliveries of goods is empty.

The apparatus according to the invention comprises a lock box with a digital lock. The digital lock is preferably operated by a controller in communication with a personal computer or other terminal device belonging to the lock box owner. As used herein, "owner" connotes any person or entity authorized to receive goods using the lock box, and is not limited to the person with legal title to the lock box. The owner preferably may generate and control the combination codes used with the box using the terminal device, including providing variable codes to merchants or deliverers of goods. In the alternative, the combination codes may be controlled manually by an input device, such as a keypad, connected to the controller.

The interior of the lockbox may comprise a simple enclosure with two access doors. Through a delivery access door, goods may be placed in the box, but not removed. A larger removal door is used for removal of goods. The controller controls access to both doors. However, this type of lockbox may be undesirably bulky.

Therefore, in an embodiment of the invention, the interior of the box is divisible into at least two sections. The box may be accessed by one or more doors, each under the control of the controller. At least one of the sections, that is, a receiving section or sections, may be designated for future delivery of goods. At least another of the sections, that is, a storage section or sections, may be designated for storage of goods after delivery. Preferably, the receiving section is accessible by deliverers of goods, but the storage section is not. Preferably, the lock box is configured such that after goods are delivered to it, the goods are moved to a storage section, or in the alternative, the configuration of the storage section is changed so that it includes all of the delivered goods. Movement of goods or sections in the lock box may be accomplished using a movable divider. Movement of the divider may be accomplished manually, or using an automatic mechanism.

A more complete understanding of a method and apparatus for securing delivery of goods will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 5B is a cross sectional view of the side of a security box opened for the delivery of a first package.

FIG. 5C is a cross sectional view of the side of a closed security box after the delivery of a first package.

DETAILED DESCRIPTION OF THE PREFERRED EMBODIMENT

The present invention is directed towards a method and apparatus for securing delivery of goods. More specifically, this invention pertains to a security box 100 that can only be opened with variable combinations, represented either by an owner access code or a deliverer access code, entered into a digital interface, and method of operating the security box in cooperation with merchants, deliverers, and owners. Owner access codes may be given upon purchasing a security box, and subsequently changed at the discretion of the owner. Owner access codes are operative for repeated access to the security box. Deliverer access codes are only for one-time use. Deliverer access codes may be generated by the user computer system 400 after purchasing a deliverable product, or by the consumer directly on the security box 100, such as by using a keypad or other input device. In a preferred embodiment of the invention, the deliverer access code is simultaneously transmitted to the merchant computer system 300 providing the deliverable product. The merchant then forwards this access code to the appropriate shipping providers for use upon delivery.

Figure 1:
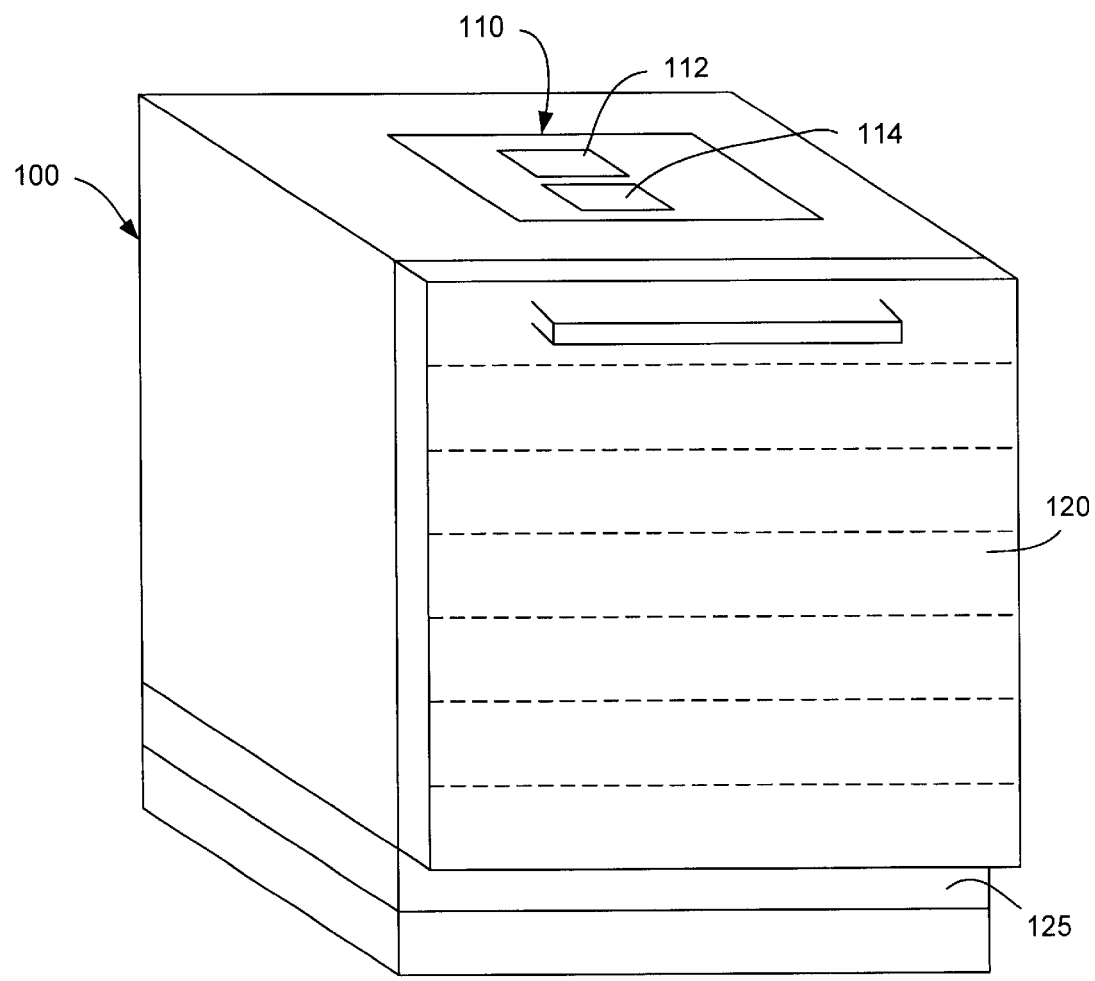
FIG. 1 is an illustration of a closed security box according to a preferred embodiment of the invention.

In FIG. 1, shows an exemplary closed security box 100 according to an embodiment of the invention. The exemplary security box 100 is drawn and described in a simplified, conceptual manner illustrative of the functions of a box according the invention. Numerous mechanical details, as would be apparent to one skilled in the art, have been omitted. One skilled in the art will recognize that the functions of box 100 may be accomplished using various alternative mechanical designs, and the invention is not limited by any particular design such as may be suggested by the illustrated embodiment. Exemplary security box 100 is comprised of a partitioned security door 120, a security door storage compartment 125, and a digital interface 110. The digital interface 110 is further comprised of a liquid crystal display (LCD) 112 and a keypad 114. In a preferred embodiment, the owner of the security box 100 as well as deliverers of packages to the security box 100 obtain access to the security box 100 by entering the appropriate access code via the digital interface 110. Upon obtaining access, the security box is unlocked enabling the security door 120 to be lowered into the security door storage compartment 125.

Figure 2:
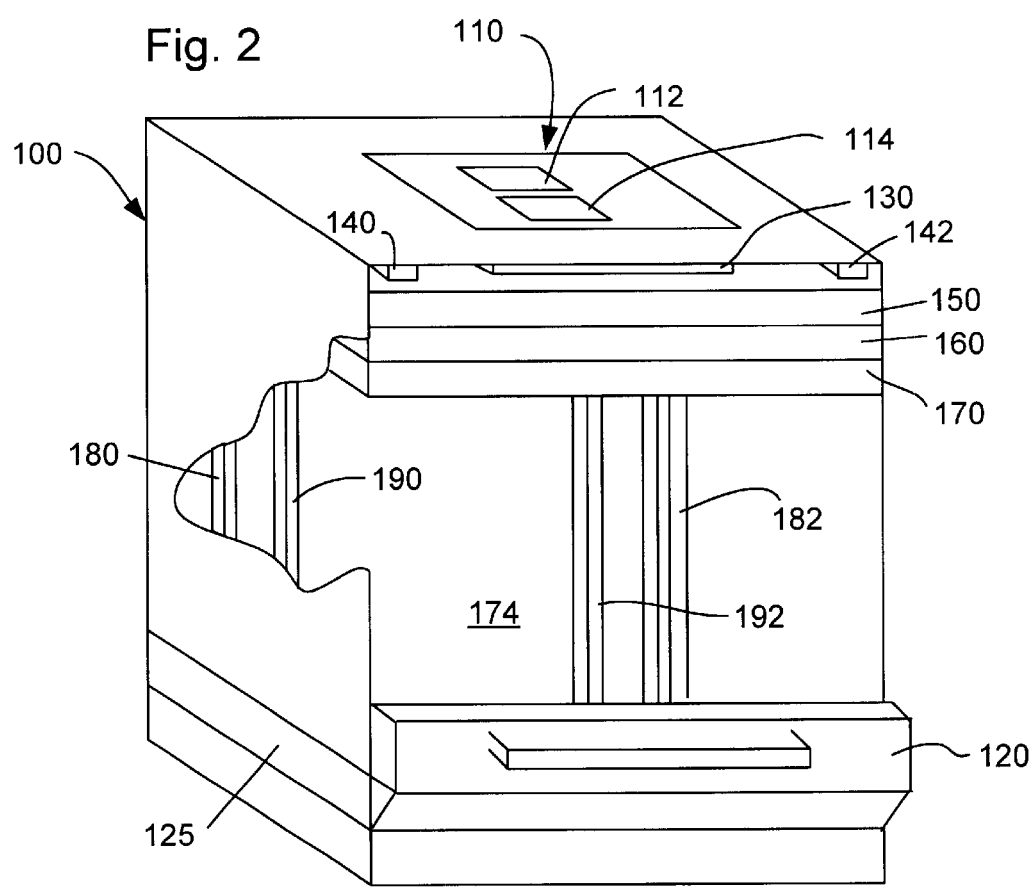
FIG. 2 is an illustration of an open security box according to a preferred embodiment of the invention.

In FIG. 2, an illustration of an open security box is provided according to a preferred embodiment of the invention. As previously stated, security door 120 lowers into the security door storage compartment 125 as illustrated. In FIG. 2, it is also shown that security box 100 is further comprised of a storage area A 174, a security box controller 130, a plurality of shelves (shelf A 170, shelf B 160, and shelf C 150) attached to both shelf rail A 190 and shelf rail B 192, lock A 140, lock B 142, dowel rail A 180, and dowel rail B 182. It should be appreciated that, although only three shelves, 170, 160, and 150, are shown, any number of shelves may be used in the described implementation without altering the scope and spirit of the invention.

Figure 3:
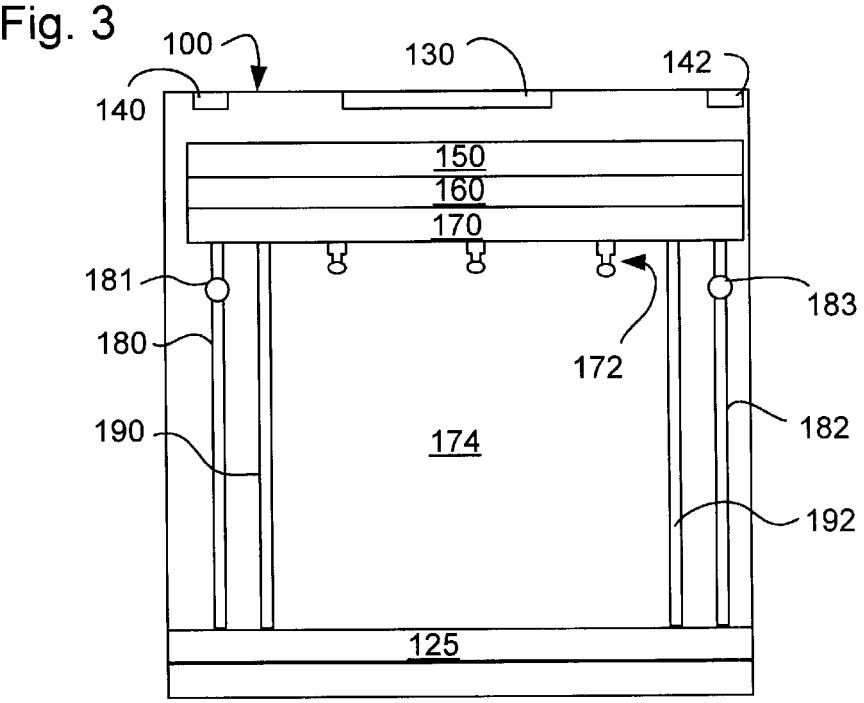
FIG. 3 is a cross sectional view of the front of the security box according to a preferred embodiment of the invention.

In a preferred embodiment of the invention, shelves 170, 160, and 150 are individually lowered whenever a package is delivered to the security box 100. The dynamics of this particular mechanical system may be better understood by examining the cross sectional view of the front of the security box provided in FIG. 3. Additional components to the security box 100 shown here in FIG. 3 include extendable dowels 181 and 183, and sensor array A 172. Once a package is delivered to storage area A 174, shelf A 170 is lowered along shelf rails 190 and 192. Shelf A 170 continues to be lowered until contact is made between any part of sensor array A 172 and the delivered package. This process is then repeated when subsequent packages are delivered to different shelves.

In a multiple shelf system, deployment of the shelves, i.e., movement of the shelves after a new package is placed in the security box, may be accomplished manually or automatically. If the shelves are moved manually, the need for sensors, actuators, and control mechanisms may be avoided. After placing a package in the box, the deliverer would simply slide the next shelf in the stack to its lowest position in the box, and lock it in place. The sliding of the shelves is preferably governed by a one-way ratchet mechanism, so that deliverers may slide the shelves in only one direction. The ratchet is preferably made accessible only to the box owner, who after removing the packages from the security box, may return the shelves to their starting position. Deliverers would be motivated to move the shelf in order to protect their package from access or damage from the next delivery.

Although the illustrated embodiment shows multiple shelves, it may be desirable to utilize a single shelf similar to one of shelves 150, 160, 170, instead of multiple shelves. The single shelf should be made capable of retracting or folding out of the way when a new package is placed in the security box. For example, after a deliverer has placed a new package in the security box and closed the box, the retractable shelf would automatically retract from under the package (such as by a telescoping or folding action), move to the top of the security box, extend to a fully open position, and then slowly lower itself until it contacted the top of the new package. The retractable shelf would thus act as a movable, automatically deployed divider between a receiving section of the security box and a storage section of the box. After the retractable shelf is redeployed, the receiving area is empty and ready to receive another package.

As stated previously, in a preferred embodiment two types of access codes may be used that trigger two slightly different mechanisms for opening the security door 120. In particular, one type of access code may used exclusively for the owner of the security box 100 and a second type of access code given for one-time use by deliverers of packages. When using the owner access code, full access may be granted (i.e., access to all shelves, 150, 160, and 170), while a deliverer access code may provide only partial access to the security box (i.e., access to only one of shelves, 150, 160, and 170).

Figure 5A:
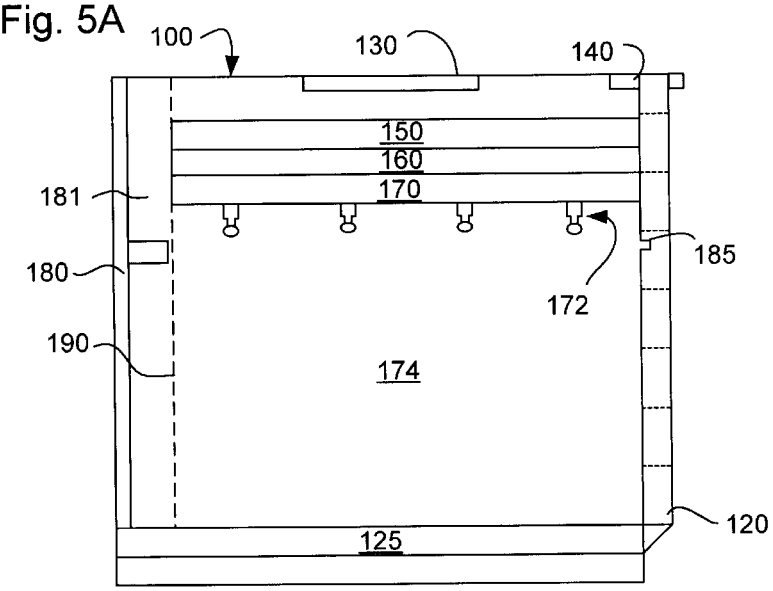
FIG. 5A is a cross sectional view of a side of a closed security box before the delivery of a package.
Figure 5D:
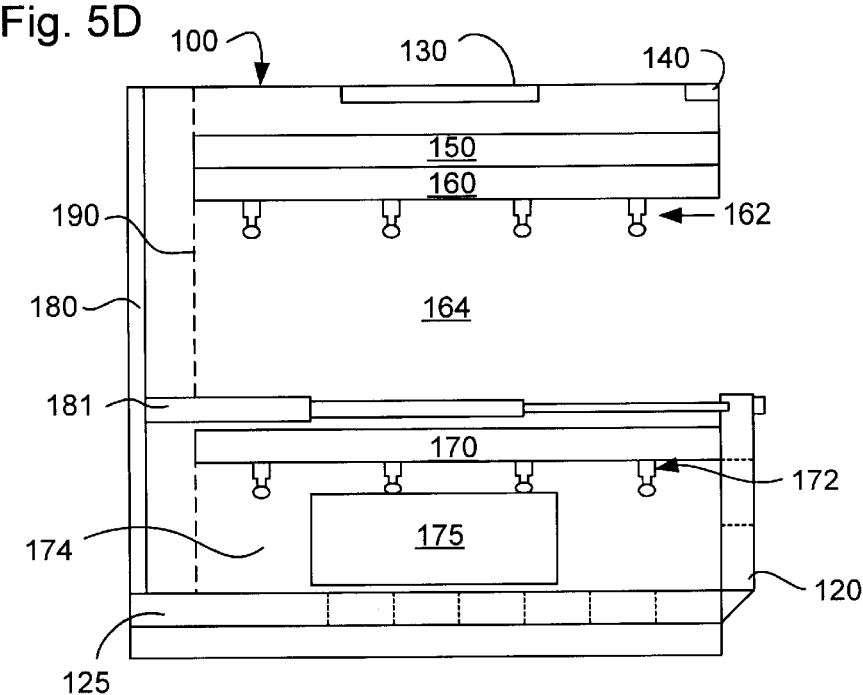
FIG. 5D is a cross sectional view of the side of a security box opened for the delivery of a second package.

Operation of the security box 100 is further illustrated by FIGS. 5A, 5B, 5C, and 5D. Once an owner or a deliverer obtains access to the security box 100, via either type of access code, locks 140 and 142 are deactivated by the security box controller 130. If an owner access code is used, extendable dowels 181 and 183 remain unextended as shown in FIGS. 5A and 5C. However, if a deliverer access code is used, extendable dowels 181 and 183 extend themselves and lock into their respective dowel cavities located in security door 120 as shown in FIGS. 5B and 5C. As a result, security door 120 may either be fully lowered into the security door storage compartment 125 without obstruction (i.e., using an owner access code) or, only partially lowered until the paths of extended dowels, 181 and 183, become obstructed (i.e., using a deliverer access code). The function of these dowels, 181 and 183, is thus to grant full access of shelves to owners and to prevent deliverers from having access to shelves where other packages from other deliverers may be. As illustrated in FIG. 5D, for example, the extension of dowel 181 prevents security door 120 from being lowered below shelf A 170, thus providing security for delivered package 175.

Any other suitable locking mechanism capable of locking security door 120 at various open positions may be used instead of extendable dowels 181, 183. For example, the top edge of the security door may be provided with a protruding lock (such as a series of lockable, retractable pins) that prevents lowering of the door past the level of the topmost shelf in use. Any unused shelves would be stored in a ceiling space above the door, so as to not interfere with the operation of the door. The protruding lock on the security door may be retracted only by the owner, to allow the owner to fully open the door to access all packages stored in the security box. One skilled in the art may devise other suitable mechanisms for dividing the security box into two areas of variable space, and locking the areas as described.

Figure 4:
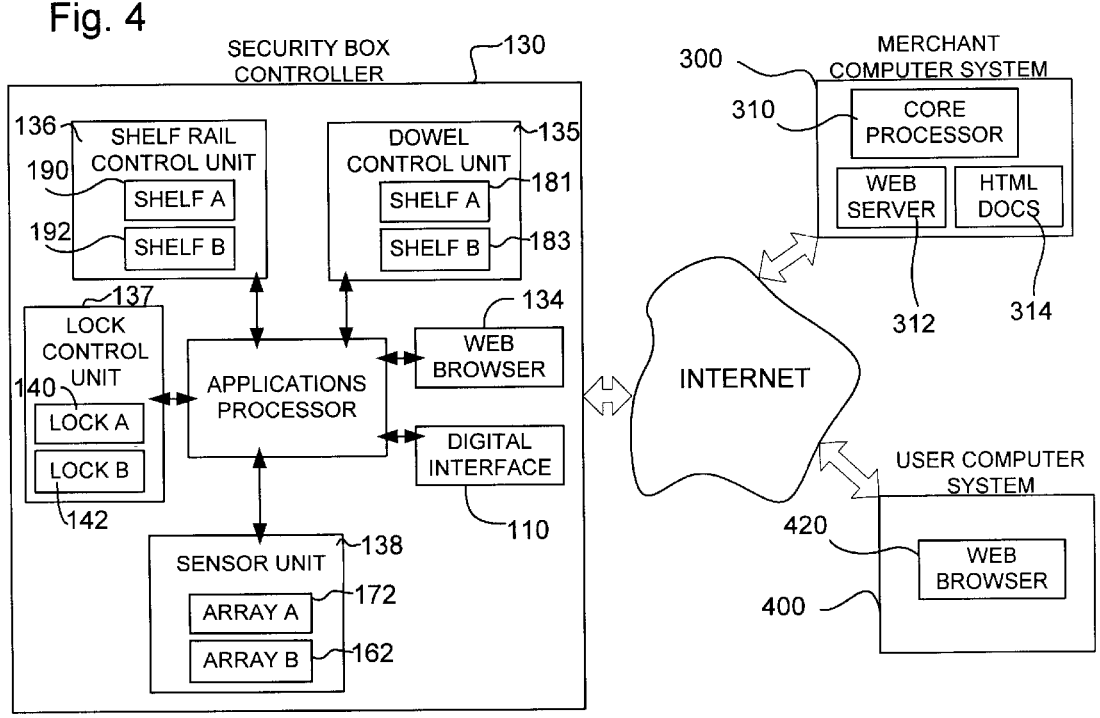
FIG. 4 is a block diagram illustrating the computer network system implemented in a preferred embodiment of the invention.

In FIG. 4, a block diagram illustrating the computer network system implemented in a preferred embodiment of the invention is provided. As illustrated, a security box controller 130 is shown to communicate with merchant computer systems 300 and a user computer systems 400 via the Internet 200. The Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations that may be made in the future, including changes and additions to existing standard protocols. User computers 400 may include any type of computing device that allows a user to interactively browse websites, such as a personal computer (PC) that includes a Web browser application 420 (e.g., Microsoft Internet Explorer™ or Netscape Communicator™). Suitable user computers 400 equipped with browsers 420 are available in many configurations, including handheld devices (e.g., PalmPilot™), personal computers (PC), laptop computers, workstations, television set-top devices, multi-functional cellular phones, and so forth.

As illustrated in FIG. 4, the security box controller 130 is further comprised of an applications processor coupled to the shelf rail control unit 136, the dowel control unit 135, the locking mechanism control unit 137, the sensor unit 138, a digital interface 110, and a Web browser 134. The merchant computer system 300 is, meanwhile, further comprised of a core processor 310 coupled to a Web server 312 connected to an HTML (Hyper-Text Markup Language) documents database 314. As is also generally known in the art, Web servers (such as Web server 312) access a plurality of Web pages, distributable applications, and other electronic files containing information of various types respectively stored in HTML document database 314. As a result, Web pages may be viewed on various user computers 400; for example, a particular Web page or other electronic file may be viewed through a suitable application program residing on a user computer 400, such as a browser 420, or by a distributable application provided to the user computer 400 by Web server 312.

It should be appreciated that a user identifies a desired Web page for delivery to the user computer 400 by communicating an HTTP (Hyper-Text Transport Protocol) request from the browser application 420. The HTTP request includes the Uniform Resource Locator (URL) of the desired Web page, which may correspond to an HTML document stored in the HTML documents databases 314. The HTTP request is then routed to Web server 312 via the Internet 200. The Web server 312 then retrieves the HTML document identified by the URL, and communicate the HTML document across the Internet 200 to the browser application 420. The HTML document may be communicated in the form of plural message packets as defined by standard protocols, such as the Transport Control Protocol/Internet Protocol (TCP/IP).

Figure 6:
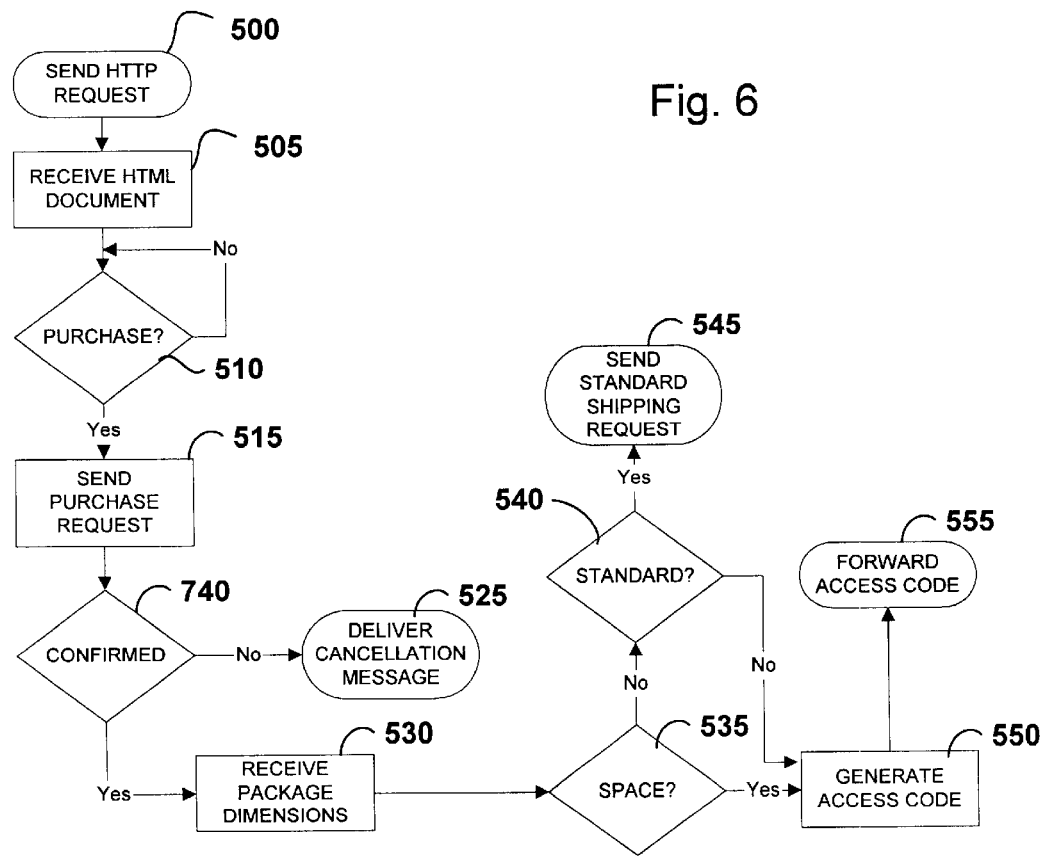
FIG. 6 is a flow chart illustrating the steps followed by user computers when generating access codes according to a preferred embodiment of the invention.

In FIG. 6, a flow chart illustrating the steps followed by the user computer system 400 when generating access codes is provided. In a preferred embodiment, the user computer system may also be used to access the security box controller via the Internet 200. The procedure begins at step 500 when the user computer system 400 sends an HTTP request corresponding to the electronic commerce Web page of the desired merchant computer system 300. The appropriate HTML document, according to the request made at step 500, is then received by the user computer 400 at step 505.

At this point, the user computer 400 has obtained access to the electronic commerce platform of the desired merchant computer system 300. Once this access is obtained, the user proceeds by ordering whichever products it desires from this particular merchant. Meanwhile, the user computer system 400 continuously monitors the actions of the user at step 510 in order to determine if a purchase is made. If a purchase is indeed made at step 510, then a purchase request is sent to the merchant computer system 300 at step 515.

The procedure continues with the user computer 400 awaiting confirmation for this order from the merchant computer system 300 at step 520. If this order is indeed confirmed at step 520, then the user computer 400 proceeds by receiving package dimensions for this order at step 530 from the merchant computer system 300; otherwise, the order is cancelled and a cancellation message is subsequently sent by the user computer 400 at step 525.

Once the user computer 400 receives package dimensions at step 530, it is then determined whether there is sufficient space in the security box 100 for this package at step 535. For example, in the security box 100 shown in FIG. 5A, storage area A 174 is the largest area available for deliveries. Within this example, if a purchase is made by the user, the dimensions of the package corresponding to that purchase are compared to the dimensions of storage area A 174 at step 535. Similarly, if the largest available storage space is storage area B 164, as shown in FIG. 5C, then the dimensions of the package are compared to the dimensions of storage area B 164 at step 535.

If it is determined, at step 535, that the space available is sufficient to store the package purchased by the user, then a security access code is generated at step 550 which is then forwarded to both the merchant computer system 300 and the security box controller 130 at step 555; otherwise, the user computer 400 shall ask the user how it wants the package to be sent at step 540. In particular, step 540 asks the user if it wants to proceed with delivery to the security box 100, or whether it wants the package sent via conventional methods. Therefore, if user computer 400 determines that the user wants its purchased products shipped conventionally, then a request for this particular type of shipment is sent to the merchant computer system 300 at step 545; otherwise, the user computer generates an access code for this particular delivery at step 550 which is then forwarded to both the merchant computer system 300 and the security box controller 130 at step 555. If the user decides to continue with delivery to the security box 100, regardless of the unavailability of space, the user must make space prior to the delivery of the package in order to ensure that it fits in the appropriate storage area.

Figure 7:
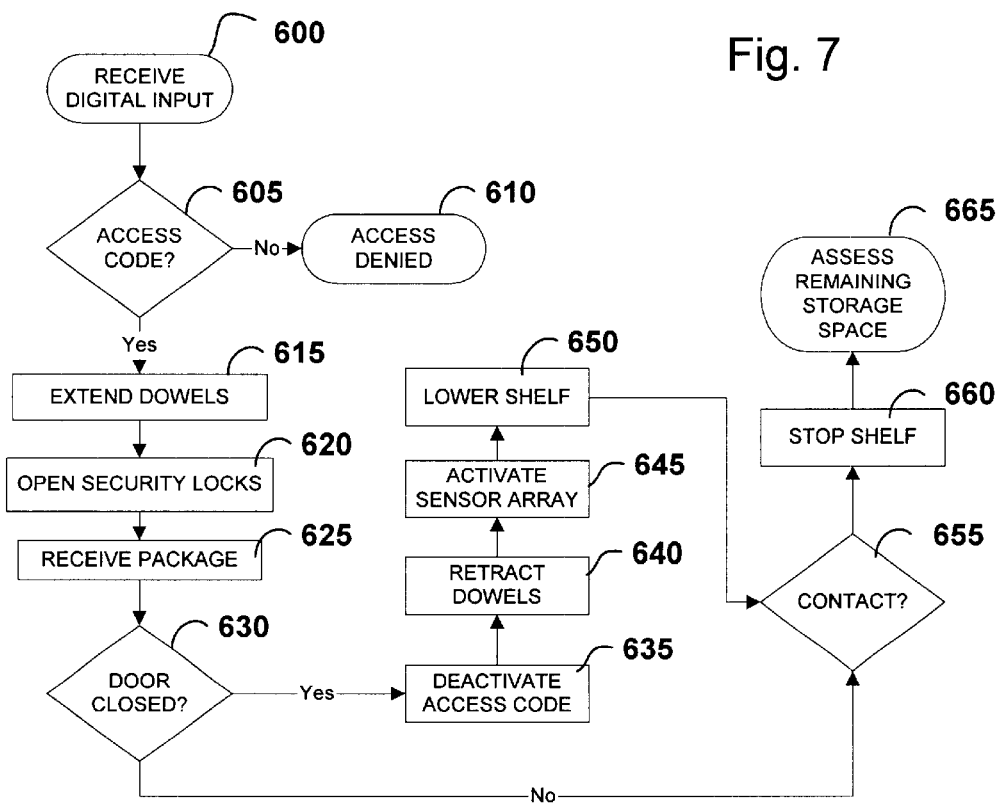
FIG. 7 is a flow chart illustrating the procedure for unlocking the security box for deliveries.

In FIG. 7, a flow chart illustrating the procedure for unlocking security box 100 for deliveries is provided. This procedure begins at step 600 when the security box controller 130 receives an input from its digital interface 110. The security box controller 130 then determines whether this input is a valid delivery access code at step 605. If the input is indeed a valid delivery access code, then dowel A 181 and dowel B 183 are both extended at step 615; otherwise, access to the security box 100 is denied at step 610. Once the dowels 181, 183 have been extended at step 615, the procedure continues with security lock A 140 and security lock B 142 both being unlocked at step 620.

At this point, the deliverer of the expected package may open the security box 100. It should be noted, however, that extended dowels 181 and 183 (or other suitable locking mechanism) will allow for the security door 120 to only open as far as the locking mechanism allows. For example, in the security box 100 shown in FIG. 5A, storage area A 174 is empty. In this example, when a first deliverer opens the security door 120, extended dowels 181 and 183 will respectively slide down dowel rails 180 and 182 until they are prevented from further movement by the bottom of storage area A 174 (i.e., the inside floor of the security box 100) as shown in FIG. 5B. After this first package 175 is delivered, the security box 100 will appear as shown in FIG. 5C. Therefore, when a second deliverer opens the security box to deliver a second package, the security door 120 will only open as far as the level of extended dowels 181 and 183 at the bottom of storage area B 164 (i.e., the top of shelf B 160) as illustrated in FIG. 5D.

Returning to the flow chart described in FIG. 7, a package is then received from the deliverer at step 625. After receiving the package at step 625, the security box controller waits until the security door 120 has been properly closed at step 630. Once the security door 120 is properly closed at step 630, the access code accepted at step 605 is deactivated at step 635. Next, dowels 181 and 183 are retracted and returned to their original positions on dowel rail A 180 and dowel rail B 182, respectively. The sensor array corresponding to the shelf directly above the delivered package is then activated at step 645 followed by the lowering of that particular shelf at step 650. If this was a first delivery, for example, then sensor array A 172 would be activated at step 645 and shelf A 170 would be lowered at step 650.

Continuing with this example, the security box controller 130 then proceeds with step 655 where it continuously monitors the triggering of any sensor in sensor array A 172 as shelf A 170 is lowered. Once contact is made on at least one of these sensors, the lowering of the shelf is halted at step 660. The procedure then concludes at step 665 with the security box controller 130 determining how much remaining storage space is available for any additional deliveries. It should be appreciated that this determination may be made according to where the lowered shelf is stopped at step 660. In the security box 100 illustrated in FIG. 5C, for example, the security box controller 130 may determine the dimensions of storage area B 164 based on how far shelf A 170 was lowered. As a result, subsequent purchases by the user may be made according to how much available space the security box 100 currently comprises.

Figure 8:
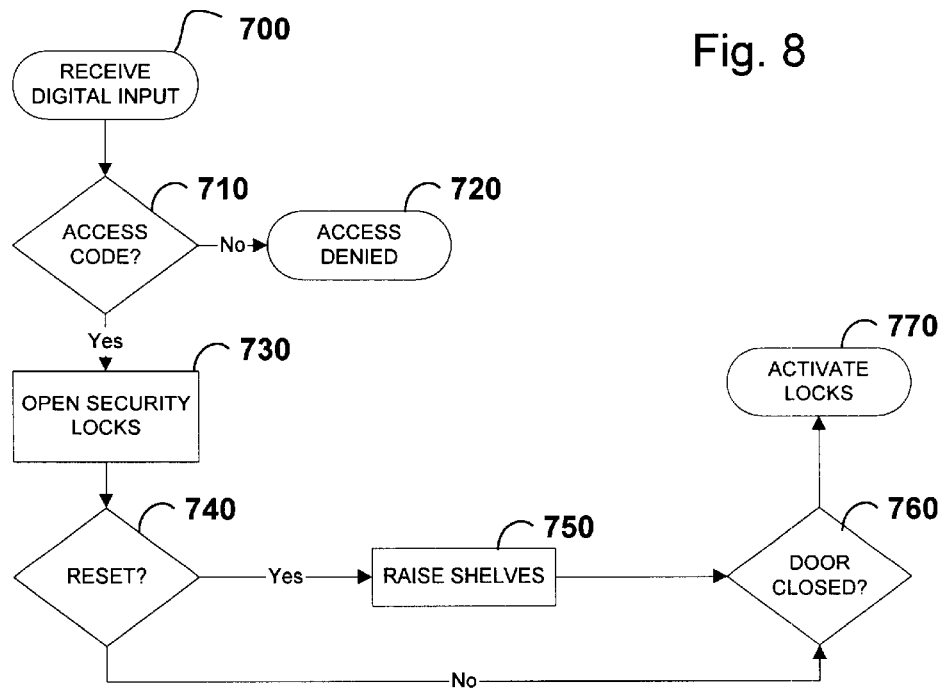
FIG. 8 is a flow chart illustrating the procedure for unlocking the security box for retrieval of deliveries by the owner.

In FIG. 8, a flow chart illustrating the procedure for unlocking the security box for retrieval of deliveries by the owner is provided. This procedure begins at step 700 when the security box controller 130 receives an input from its digital interface 110. The security box controller 130 then determines whether this input is a valid user access code at step 710. If the input is indeed a valid user access code, then the procedure continues with security lock A 140 and security lock B 142 both being unlocked at step 730; otherwise, access to the security box 100 is denied at step 720.

Once security locks 140 and 142 are unlocked at step 730, the user may open the security door 120. Because dowels 181 and 183 were not extended, security door 120 may be fully opened. As a result, the user may retrieve packages located on any of the shelves within the security box 100. After retrieving these packages, the security box controller 130 waits for the user to confirm that these packages were indeed retrieved at step 740. In a preferred embodiment, this confirmation may be received via a reset button located on the digital interface 110.

If confirmation is received from the user at step 740, then all shelves are returned to their original positions at step 750 followed by a determination of whether security door 120 has been closed at step 760; otherwise, step 750 is bypassed and the procedure continues directly with the determination of whether security door 120 has been closed at step 760. Once the security door 120 has been closed, the procedure concludes with security locks 140 and 142 being activated at step 770.

Having thus described a preferred embodiment of a method and apparatus for securing delivery of good purchased via electronic or telephonic commerce, it should be apparent to those skilled in the art that certain advantages of the within system have been achieved. It should also be appreciated that various modifications, adaptations, and alternative embodiments thereof may be made within the scope and spirit of the present invention. For example, a security box with multiple sliding shelves has been described, but a security box with a single sliding shelf or other divider is also be within the scope of the invention. Security boxes with no movable divider at all may also be operated within the scope of the invention. The invention is further defined by the following claims.

What is claimed is:

1. A method for receiving packages delivered to a secured area, the method comprising:

dividing the secured area into a plurality of separate sections;

opening for access at least one of the separate sections of the secured area upon receipt of a delivery access code;

securing from access any section of the secured area that already contains a package when the delivery access code is used to access the secured area;

deactivating the delivery access code so that the delivery access code is no longer operative to access the secured area after the at least one of the separate sections has been accessed using the delivery access code, and automatically determining an amount of vacant space available in a largest one of the plurality of separate sections of the secured area.

2. The method of claim 1, the further comprising providing a secured area comprising a digital lock box.

3. The method of claim 1, further comprising opening for access all of the separate sections of the secured area upon receipt of a owner access code.

4. The method of claim 1, further comprising transmitting the delivery access code to a remote party.

5. The method of claim 1, wherein said dividing step further comprises dividing the secured area using at least one movable barrier.

6. The method of claim 1, wherein said dividing step further comprises adjusting at least one dimension of the at least one of the plurality of separate sections of the secured area according to at least one dimension of a package placed in the at least one of the plurality of separate sections.

7. The method of claim 1, further comprising comparing the amount of vacant space available with dimensions of a package that is not yet delivered to the secured area.

8. The method of claim 7, further comprising transmitting a message when the dimensions of the package that is not yet delivered exceeds the amount of vacant space available.

9. The method of claim 1, wherein said dividing step further comprises a reset mechanism triggered upon removal of all delivered contents of the secured area.

10. The method of claim 1, wherein said dividing step further comprises dividing the secured area using a plurality of movable barriers.

11. A system for receiving packages delivered to a secured area, the system comprising:

a digital lock box connected to a computer network, the digital lock box operative to perform the functions of:

opening for access at least one of the separate sections of the secured area upon receipt of a delivery access code;

securing from access any section of the secured area that already contains a package when the delivery access code is used to access the secured area; and deactivating the delivery access code so that the delivery access code is no longer operative to access the secured area after the at least one of the separate sections has been accessed using the delivery access and automatically determining an amount of vacant space available in a largest one of the plurality of separate sections of the secured area.

12. The system of claim 11, wherein the digital lock box is further operative to perform the function of opening for access all of the separate sections of the secured area upon receipt of a owner access code.

13. The system of claim 11, wherein the digital lock box is further operative to perform the function of transmitting the delivery access code to a remote party.

14. The system of claim 11, wherein the digital lock box is further operative to perform the function of adjusting at least one dimension of the at least one of the plurality of separate sections of the secured area according to at least one dimension of a package placed in the at least one of the plurality of separate sections.

15. The system of claim 11, wherein the digital lock box is further operative to perform the function of comparing the amount of vacant space available with dimensions of a package that is not yet delivered to the secured area.

16. The system of claim 15, wherein the digital lock box is further operative to perform the function of transmitting a message when the dimensions of the package that is not yet delivered exceeds the amount of vacant space available.

17. The system of claim 11, wherein the digital lock box is further operative to perform the function of dividing the secured area using a plurality of movable barriers.

18. The system of claim 11, wherein the digital lock box is further operative to perform the function of dividing the secured area using at least one movable barrier.

* * * * *